United States Patent

Hunziker et al.

[15] 3,697,523
[45] Oct. 10, 1972

[54] 2-SUBSTITUTED-11-(4-METHYL-1-PIPERIZINYL)-DIBENZO [B,F]-1,4-OXAZEPIN-(4-OXIDE)

[72] Inventors: Fritz Hunziker, Berne; Jean Schmutz, Muri b/Berne, both of Switzerland

[73] Assignee: Sandoz Ltd., (aka Sandoz AG), Basle, Switzerland

[22] Filed: Aug. 12, 1969

[21] Appl. No.: 849,522

[30] Foreign Application Priority Data

| Aug. 23, 1968 | Switzerland | 12731/68 |
| Nov. 4, 1968 | Switzerland | 16388/68 |
| Jan. 24, 1969 | Switzerland | 1042/69 |
| May 2, 1969 | Switzerland | 6772/69 |

[52] U.S. Cl. ............................260/268 TR, 424/258
[51] Int. Cl. .............................................C07d 51/70
[58] Field of Search.............................260/268 TR

[56] References Cited

UNITED STATES PATENTS

| 3,546,226 | 12/1970 | Schmutz et al. | 260/268 TR |
| 3,341,533 | 12/1967 | Vale | 260/243 AA |
| 3,047,579 | 7/1962 | Witman | 260/289 |
| 3,412,193 | 11/1968 | Coppola | 424/250 |
| 3,458,516 | 7/1969 | Howell | 260/268 |
| 3,539,573 | 11/1970 | Schmutz et al. | 260/268 |

OTHER PUBLICATIONS

Gauch et al., Il Farmaco (Ed. Prac.), Vol. 24, p 100–109 (1969)
Gauch et al., (II and III) Chem. Abstr., Vol. 70, (Col. 85891j and 85892k) (1969)
Schmutz et al., Chem. Abstr., Vol. 66, Cols. 8890–8891 (abstracting Helv. Chem. Octa, Vol. 50, p 245–254) (1967)

*Primary Examiner*—Donald G. Daus
*Attorney*—Gerald D. Sharkin, Robert S. Honor, Frederick H. Weinfeldt, Richard E. Vila and Walter F. Jewell

[57] ABSTRACT

The invention concerns novel compounds of the formula:

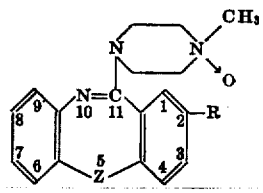

wherein Z is oxygen or sulfur, and R is chlorine, bromine, nitro or methyl, and pharmaceutically acceptable acid addition salts thereof. A process for the production of the above compounds is also described.

The compounds are useful neuroleptics.

1 Claim, No Drawings

2-SUBSTITUTED-11-(4-METHYL-1-PIPERIZINYL)-DIBENZO [B,F]-1,4-OXAZEPIN-(4-OXIDE)

The present invention relates to compounds of the formula I,

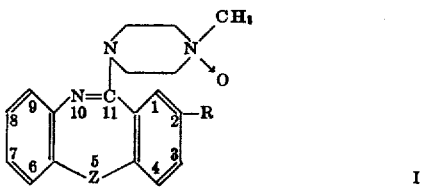

I in which Z signifies oxygen or sulphur, and R signifies chlorine, bromine, nitro or methyl, and acid addition salts thereof, as well as to a process for their production.

A compound of the formula I and an acid addition salt thereof may, in accordance with the invention, be produced by treating a compound of formula II,

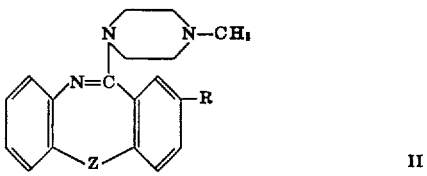

II in which Z and R have the above significance, with an oxidizing agent, and when required converting the resulting compound of formula I into an acid addition salt by reaction with a suitable inorganic or organic acid.

The oxidation is conveniently effected by dissolving a compound of formula II in an organic solvent which is inert under the reaction conditions and treating the resulting solution with an oxidizing agent. The reaction temperature is then conveniently between room temperature and the boiling temperature of the solution.

Favorable results are obtained when employing hydrogen peroxide as oxidizing agent, for example a 30 percent aqueous solution, and an alcohol, especially methanol or ethanol, acetone, ethyl acetate or acetic anhydride as solvent. However, oxidation may likewise be effected with other oxidizing agents, such as perbenzoic acid in benzene or chloroform, peracetic acid in ether or acetic anhydride, Caro's acid in water, calcium hypochlorite in dioxane/water, or with organic hydroperoxides, especially tert.butyl hydro-peroxide in benzene, the reaction being carried out in the presence of a heavy metal catalyst, preferably vanadium pentoxide.

To ensure that the sulphur atom in the 5 position of a dibenz[b,f]--thiazepine of formula II, wherein Z signifies sulphur, remains unaffected in the reaction, the reaction is conveniently effected in a non-acid medium and not with substantially more than one equivalent of oxidizing agent. In this reaction the oxidizing agent should also preferably not itself be acidic nor capable of liberating an acid under the reaction conditions (e.g. a 30 percent aqueous solution of hydrogen peroxide).

After the reaction is complete, the oxidizing agent still present in the reaction mixture may be decomposed, e.g. in the case of hydrogen peroxide by treatment with palladium charcoal powder. The compounds of formula I may then be isolated and purified in known manner. The resulting compound of formula I may be isolated in the form of an acid addition salt or may subsequently be converted into such salt.

The compounds of formula II, employed as starting materials in the process, are known or may be prepared by known processes.

Examples of acids suitable for the formation of salts of compounds of formula I include organic acids such as toluenesulphonic, malonic, succinic, malic, maleic or tartaric acid, and inorganic acids such as hydrohalic acids, sulphuric, nitric or phosphoric acid.

The compounds of formula I and their pharmaceutically acceptable acid addition salts are useful because they possess pharmacological activity in animals. In particular, the compounds are useful neuroleptics, as for example exhibited by their properties in subduing motility in mice and rats, generally accompanied by cataleptic and apomorphine antagonistic effects. The 2-chloro-11-(4-methyl-1-piperazinyl)-dibenz[b,f]-1,4-oxazepin-(4-oxide) is particularly active.

The effectiveness of the compounds of the invention is comparable with that of the corresponding tertiary amines (compounds of formula II), but it has surprisingly been found that the N-oxides of formula I are considerably less toxic than the tertiary amines. Thus, as for example shown from oral administration of the above-mentioned 2-chloro-11-(4-methyl-1-piperazinyl)-dibenz[b,f]-1,4-oxazepin-(4-oxide) in mice, the compound is 10 times less toxic than the corresponding 2 - chloro-11-(4-methyl-1-piperazinyl)-dibenz[b,f]-1,4-oxazepine.

For the above-mentioned use, the dosage administered will, of course, vary depending upon the compound employed, the mode of administration and treatment desired. However, in general, satisfactory results are obtained when administered at a daily dosage of from about 0.3 to about 3 milligrams per kilogram of animal body weight. For the larger mammals, the total daily dosage is in the range of from about 20 to about 200 milligrams.

The compounds of formula I and their salts may be used as medicaments on their own or in the form of appropriate medicinal preparations for oral administration, e.g. in the form of tablets or dragees, or for parenteral administration, e.g. in the form of injectable solutions.

In the following non-limitative Examples all temperatures are indicated in degrees Centigrade and are corrected.

EXAMPLE 1

2-Chloro-11-(4-methyl-1-piperazinyl)-dibenz[b,f]-1,4-oxazepin-(4-oxide).

4.3 cc of a 30 percent aqueous hydrogen peroxide solution are added to a solution of 6.6 g of 2-chloro-11-(4-methyl-1-piperazinyl)-dibenz[b,f]-1,4-oxazepine (M.P. 109°–110°) in 40 cc of 95 percent ethanol at 10°–15° while stirring and cooling with ice/water. The mixture is subsequently allowed to stand at room temperature for 62 hours and is then stirred for a further 2 hours. Excess hydrogen peroxide is decomposed by stirring at room temperature with 0.4 g of 5 percent palladium-charcoal powder for 1 hour, and subsequently heating on a steam bath for 15 minutes. After separating the catalyst by filtration and washing with alcohol 60 cc of water are added to the filtrate and this is concentrated in a vacuum to about 40 cc. The residue is divided between ether and water and the aqueous phase is evaporated to dryness. The residue is clarified in acetone solution with charcoal and is recrystallized from acetone/ether, whereby 2-chloro-11-(4-methyl-1-piperazinyl)-dibenz[b,f]-1,4-oxazepin-(4-oxide) monohydrate, having a M.P. of 166°–168°, is obtained.

EXAMPLE 2

2-Nitro-11-(4-methyl-1-piperazinyl)-dibenz[b,f]-1,4-oxazepin-(4-oxide).

8.6 cc of a 30 percent aqueous hydrogen peroxide solution are added to a solution of 6.8 g of 2-nitro-11-(4-methyl-1-piperazinyl)-dibenz[b,f]-1,4-oxazepine (M.P. 192°–193°) in 75 cc of 95 percent ethanol at 10°–15° while stirring and cooling with ice/water, and the solution is subsequently heated to 60° for 1 hour. The reaction mixture is subsequently stirred at room temperature for a further 8 hours, is then allowed to stand at room temperature for 62 hours and is again stirred for 2 hours. Excess hydrogen peroxide is decomposed by stirring with 0.8 g of 5 percent palladium-charcoal powder at room temperature for 1 hour and subsequently heating on a steam bath for 15 minutes. After removing the catalyst by filtration and washing with alcohol, 60 cc of water are added to the filtrate, this is concentrated in a vacuum to about 40 cc, is clarified with charcoal and subsequently filtered. The residue obtained after complete evaporation of the filtrate is crystallized from methanol/ether, whereby 2-nitro-11-(4-methyl-1-piperazinyl)-dibenz[b,f]-1,4-oxazepin-(4-oxide) dihydrate, having a M.P. of 165°–170°, is obtained.

EXAMPLE 3

2-Bromo-11-(4-methyl-1-piperazinyl)-dibenz[b,f]-1,4-oxazepin-(4-oxide).

1.75 cc of a 30 percent aqueous hydrogen peroxide solution are added to a solution of 2.98 g of 2-bromo-11-(4-methyl-1-piperazinyl)-dibenz[b,f]-1,4-oxazepine (M.P. 95°–99°) in 16 cc of 95 percent ethanol at 10°–15° while stirring and cooling with ice/water. The reaction mixture is subsequently stirred at room temperature for a further 10 hours, is then allowed to stand at room temperature for 65 hours and is then stirred for a further 2 hours. Excess hydrogen peroxide is decomposed by stirring with 0.2 g of 5 percent palladium-charcoal powder at room temperature for 1 hour and subsequently heating on a steam bath for 15 minutes. After removing the catalyst by filtration and washing with alcohol 30 cc of water are added to the filtrate and this is concentrated in a vacuum to about 20 cc. The residue is sub-sequently divided between ether and water and the aqueous phase is evaporated to dryness. The residue is crystallized from acetone/ether, whereby 2-bromo-11-(4-methyl-1-piperazinyl)-dibenz[b,f]-1,4-oxazepin-(4-oxide), having a double M.P. of 169°–175°/221°–°, is obtained.

EXAMPLE 4

2-Chloro-11-(4-methyl-1-piperazinyl)-dibenz[b,f]-1,4-thiazepin-(4-oxide).

6.88 g of 2-chloro-11-(4-methyl-1-piperazinyl)-dibenz[b,f]-1,4-thiazepine (M.P. 117°–120°) and 2.2 cc of a 30 percent aqueous hydrogen peroxide solution in 30 cc of 95 percent ethanol are heated to the boil at reflux for 3 ½ hours. After cooling the reaction mixture is stirred with 0.3 g of 5 percent palladium-charcoal powder for 15 minutes and is subsequently boiled for 15 minutes. After removing the catalyst by filtration and washing with methanol, 50 cc of water are added to the filtrate and this is concentrated in a vacuum until a viscous syrup is obtained. This is divided between ether and water, whereby voluminous crystallization occurs. The crystals are separated and washed with ether and water. 2-Chloro-11-(4-methyl-1-piperazinyl)-dibenz[b,f]-1,4-thiazepin-(4-oxide) is obtained in the form of colourless prisms which decompose slowly from 235° and rapidly at 245°–248°.

EXAMPLE 5

2-Methyl-11-(4-methyl-1-piperazinyl)-dibenz[b,f]-1,4-thiazepin-(4-oxide).

5.7 g of 2-methyl-11-(4-methyl-1-piperazinyl)-dibenz[b,f]-1,4-thiazepine (M.P. 99°–107°) are heated to the boil at reflux with 1.95 cc of a 30 percent aqueous hydrogen peroxide solution in 27 cc of 95 percent ethanol for 3 ½ hours. After cooling the reaction mixture is stirred with 0.3 g of 5 percent palladium-charcoal powder for 15 minutes and is subsequently boiled for 15 minutes. After removing the catalyst by filtration and washing with methanol 50 cc of water are added to the filtrate and this is concentrated by evaporation in a vacuum. The evaporation residue is divided between ether and water by systematic shaking out, and the aqueous phases are evaporated to dryness. The residue is crystallized from acetone/ether/petroleum ether (1:1:1), whereby 2-methyl-11-(4-methyl-1-piperazinyl)-dibenz[b,f]-1,4-thiazepin-(4-oxide) dihydrate is obtained in the form of fine needles having a M.P. of 183°–186°.

EXAMPLE 6

Description of a tablet composition.

| | |
|---|---|
| 2-Chloro-11-(4-methyl-1-piperazinyl)-dibenz[b,f]-1,4-oxazepin-(4-oxide) monohydrate | 40 mg |
| lactose | 140 mg |
| maize starch | 10 mg |
| talc | 9.5 mg |
| gelatin | 0.5 mg |
| magnesium stearate | 0.2 mg |

The tablet is conveniently provided with a breaking slit.

What is claimed is:

1. 2-chloro-11-(4-methyl-1-piperazinyl)-dibenz[b,f]-1,4-oxazepin-(4-oxide).

* * * * *